US012769027B2

(12) United States Patent
Queloz et al.

(10) Patent No.: US 12,769,027 B2
(45) Date of Patent: Oct. 20, 2026

(54) SKIN CONTACT SENSING DEVICE

(71) Applicant: EM Microelectronic-Marin SA, Marin (CH)

(72) Inventors: Sylvain Queloz, Constantine (CH); Gérald Monin, Neuchâtel (CH)

(73) Assignee: EM Microelectronic-Marin SA, Marin (CH)

( * ) Notice: Subject to any disclaimer, the term of this patent is extended or adjusted under 35 U.S.C. 154(b) by 396 days.

(21) Appl. No.: 18/526,351

(22) Filed: Dec. 1, 2023

(65) Prior Publication Data

US 2024/0210590 A1 Jun. 27, 2024

(30) Foreign Application Priority Data

Dec. 22, 2022 (EP) .................................... 22216167

(51) Int. Cl.
*G01V 13/00* (2006.01)
*G01V 3/08* (2006.01)

(52) U.S. Cl.
CPC .............. *G01V 13/00* (2013.01); *G01V 3/088* (2013.01)

(58) Field of Classification Search
CPC ................... G01V 13/00; G01V 3/088; H03K 2217/94026; H03K 2217/94031; H03K 17/955; A61B 5/0531; G06F 1/163; G06F 1/1684; G06F 1/3215; G06F 1/325; G06F 1/3287; G06F 1/3231; G06F 1/3228; G06F 3/015; G06V 40/145; Y02D 10/00
See application file for complete search history.

(56) References Cited

U.S. PATENT DOCUMENTS

| | | | |
|---|---|---|---|
| 2014/0239982 | A1 | 8/2014 | Alameh et al. |
| 2017/0134022 | A1 | 5/2017 | Kim et al. |
| 2019/0346964 | A1 | 11/2019 | Rouaissia et al. |

OTHER PUBLICATIONS

European Search Report for EP 22 21 6167 dated May 25, 2023.

*Primary Examiner* — A. Hunter Wilder
(74) *Attorney, Agent, or Firm* — Sughrue Mion, PLLC

(57) ABSTRACT

A skin contact sensing device (10) including a contact sensor (11) operable to generate electrical contact signals being indicative of a skin contact; a processor (12) connected to the contact sensor (11) and operable to process the electrical contact signals received from the contact sensor (11); and a memory (15) connected to the processor (12) and operable to store at least one calibration parameter, wherein the processor (12) is operable to ascertain a skin contact by processing of the electrical contact signals on the basis of the at least one calibration parameter and wherein the processor (12) is operable to read and to obtain the at least one calibration parameter from the memory (15).

8 Claims, 2 Drawing Sheets

SKIN CONTACT SENSING DEVICE

CROSS REFERENCE TO RELATED APPLICATION

This application claims priority to European Patent Application No.

22216167.1 filed Dec. 22, 2022, the entire contents of which are incorporated herein by reference.

FIELD OF THE INVENTION

The present invention relates to the field of skin contact sensing devices, in particular to skin contact sensing devices used or implemented with wearable electronic devices, such as smartwatches, eyeglasses and the like.

BACKGROUND

Detection of a mechanical contact to a body portion, e.g. to the skin of a person, is typically implemented by way of a capacitive sensor. Such capacitive sensing systems are usually power-hungry, which may encounter or lead to problems in ultra-low power systems.

With commercially available capacitive sensing controllers there is typically conducted a self-calibration procedure in response to power on the capacitive sensing controller. The self-calibration procedure severs compensate for changes in the environment.

In the event that such a self-calibrating capacitive sensor controller should be switched on while the capacitive sensor is in skin contact of a user, it is likely that the controller self-calibrates in such a way that the existing skin contact is considered as a change in the environment. The controller may thus compensate or over-compensate the measurement and may become effectively blind to the skin. As a consequence, the capacitive sensing would become somewhat inoperable and non-reliable.

It is therefore an object of the present invention to provide a solution to this problem, specifically to provide an improved skin contact sensing device that consumes less power and becomes rather attractive for low-power electronic applications.

The skin contact sensing device should be easily integratable or usable with wearable electronic devices, such as smartwatches, smart phones, earphones or eyeglasses. The skin contact sensing device should be simplistic and robust and should be operable to adapt to varying environmental conditions.

SUMMARY OF THE INVENTION

In one aspect there is a provided a skin contact sensing device. The skin contact sensing device comprises a contact sensor operable to generate electrical contact signals being indicative of a skin contact. The skin contact sensing device further comprises a processor connected to the contact sensor and operable to process the electrical contact signals received from the contact sensor. The skin contact sensing device further comprises a memory connected to the processor and operable to store at least one calibration parameter. Furthermore, the processor is operable to ascertain a skin contact by processing of the electrical contact signals on the basis of the at least one calibration parameter.

The processor is also operable to read and to obtain the at least one calibration parameter from the memory. The at least one calibration parameter is typically indicative of environmental changes, to which the contact sensor or skin contact sensing device is exposed to. Typically, such calibration parameters may be measured, obtained or recorded during an initial device setup or when deploying the skin contact sensing device, e.g. for the first time.

In case that environmental conditions, such as humidity or temperature, which typically affect the measurement precision of the contact sensor, should be subject to a change it may be necessary to re-calibrate the skin contact sensing device. Recalibration or initial calibration comes along with a determination of the at least one calibration parameter and storing the same in the memory, which memory is typically implemented as a digital memory, e.g. as a non-volatile memory.

For determining of a skin contact the electrical contact signals as generated and provided by the contact sensor are processed by the processor in conjunction or in connection with the at least one calibration parameter as taken from the memory. This has the benefit that an optional auto-calibration procedure or self-calibration procedure, e.g. conducted by the contact sensor or by the processor, can be effectively disregarded when the contact sensor is activated.

Reading of the at least one calibration parameter from a memory offers the possibility to switch off or to deactivate the contact sensor or the contact sensing equipment of the skin contact sensing device, thereby saving energy.

The skin contact sensing device, in particular the processor thereof may be implemented to deactivate, e.g. to switch off the contact sensor and/or the contact sensing hardware components of the skin contact sensing device in order to save energy. Instead, it may be intended to switch on the contact sensor and/or the associated contact sensing equipment or respective hardware components only at predefined times over a limited time interval. This may be sufficient for many application scenarios that require determination of a skin contact.

According to a further example the skin contact sensing device comprises a sensor controller connected to the contact sensor and being controller by the processor. The processor is operable to switch off the sensor controller. Hence, the processor is located outside the sensor controller. The sensor controller is provided as a separate component in addition to the processor. The processor actually controlling the sensor controller is operable to regularly switch off the sensor controller. The processor may be further operable to switch on the sensor controller. The sensor controller may be operable to conduct a self-calibration procedure upon switch on or power-up. By way of the self-calibration procedure the at least one calibration parameter may be derived.

However, during regular use of the skin contact sensing device such repeated self-calibration procedures and generation of calibration parameters derived therefrom may be disregarded by the processor. Rather, the processor may be operable to read and to obtain the at least one calibration parameter from the memory. The calibration parameter read and/or obtained from the memory may be generated and stored in the memory under predefined environmental conditions, e.g. standardized conditions, e.g. at which the contact sensor of the skin contact sensing device is typically out of contact with a skin portion of a user. In this way, the at least one calibration parameter stored in the memory may be rather robust and persistent and may not change over a time interval during which the sensor controller is switched on and/or switched off at least one or multiple times.

According to a further example the processor is operable to switch on the sensor or controller. By switching on the sensor controller the respective contact sensor may be or may become operable to generate electric contact signals that are indicative of a skin contact. After being switched on by the processor a respective measurement may be conducted and electrical contact signals may be generated, which are subsequently processed by the processor in order to detect or to determine if the contact sensor is currently subject to a skin contact. After such a measurement routine the processor may be operable to switch off or to deactivate the sensor controller, thereby saving energy.

According to a further example the sensor controller is operable to conduct an auto- or self-calibration procedure in response of being switched on. Insofar, the sensor controller may be implemented as a commercially available sensor controller with an inbuilt or integrated auto-calibration routine, which is autonomously triggered by the inbuilt or integrated electronics of the sensor controller as soon as the sensor controller is provided with sufficient electrical power or energy.

By way of the auto-calibration procedure the sensor controller may be operable to derive or to determine the at least one calibration parameter. The at least one calibration parameter as generated by and obtained from the sensor controller may only be used and stored in the memory when a respective auto-calibration procedure has been conducted in or with predefined environmental condition.

According to a further example the sensor controller is operable to generate the at least one calibration parameter by conducting the auto calibration procedure. With some examples the at least one calibration parameter is disregarded by the processor and is hence not stored in the memory, typically in situations, in which the processor and hence the skin contact sensing device operates in a sensing mode. This way, the skin contact sensing device, in particular the processor, may regularly and/or repeatedly switch off the sensor controller in order to save energy. Only during at predefined times and/or during selected or predefined time intervals the sensor controller may be switched on by the processor and a respective skin contact measurement may be conducted during these on-times of the sensor controller.

According to a further example the sensor control is operable to generate the at least one calibration parameter by conducting the auto calibration procedure. Hence, the at least one calibration parameter is provided as a result of the auto calibration procedure conducted autonomously by the sensor controller when switched on. Depending on whether the contact sensing device is in a sensing mode or in a manual calibration mode the at least one calibration parameter obtained by the inevitable or autonomously executed auto calibration procedure can be either disregarded or used as a calibration parameter for storage in the memory.

According to a further example the skin contact sensing device is switchable into a sensing mode. When in the sensing mode the processor is operable to disregard the at least one calibration parameter provided by the sensor controller in response of being switched on. This is of particular use when the sensor controller and hence the contact sensor is only temporally used for detecting a mechanical contact between the contact sensor and the skin of a user. Moreover and in this way, commercially available solutions or implementations of a sensor controller can be used, which upon power up or switching on autonomously execute a compulsory auto calibration procedure.

The present invention applies an approach of using such a commercially available sensor controller and to at least temporally disregard the at least one calibration parameter conducted by the obligatory auto-calibration procedure rather than developing a new or another sensor controller, that would offer to selectively deactivate execution or conducting of such auto-calibration procedures.

According to a further example and when in the sensing mode the processor is operable to substitute the at least one calibration parameter provided by the sensor controller in response of being switched on by the at least one calibration parameter stored in the memory. Here, and since the at least one calibration parameter has been recorded and stored in a situation, in which the skin contact sensing device is exposed to predefined environmental or external conditions it can be ensured, that the calibration parameter as obtained from the memory corresponds to a well-defined environmental condition or user environment.

According to a further example the processor is operable to switch off the sensor controller at predefined times over a predefined time interval. With many applications of a skin contact sensing device a permanent skin contact measurement may not be required. It may be sufficient to measure a skin contact or to detect a skin contact only repeatedly at predefined times over a predefined time interval. For instance, the sensor controller may be operable to switch off the sensor controller over a comparatively long time interval and to switch on the sensor controller over a comparatively short time interval.

With some examples it is conceivable that the processor is operable to switch on the sensor controller only for a few seconds every minute and to deactivate and/or to switch off the sensor controller for the residual time. In this way, the amount of power consumption can be drastically reduced without any substantial disadvantages in terms of skin contact detection.

According to a further example the processor is operable to switch off the sensor controller during a first time interval t1 and to switch on the sensor controller during a second time interval t2. The first time interval t1 may be larger than the second time interval t2. In this way, more than 50% of electrical power required for driving or for operating the sensor controller can be saved.

With other examples and when for instance the first time interval t1 is larger than 10 times the second time interval t2, more than 90% of the available electrical energy could be saved, and so on.

According to a further example the skin contact sensing device is switchable into a manual calibration mode, in which the processor is operable to read and to obtain the at least one calibration parameter provided by the sensor controller in response of being switched on and in which the processor is further operable to store the at least one obtained calibration parameter in the memory. Typically, the manual calibration mode may be triggered by a user of the skin contact sensing device. With some examples a user may be prompted to conduct such a manual calibration procedure and to switch the contact sensing device into the manual calibration mode.

Conducting of such a manual calibration procedure may be necessary with or during a first use of the skin contact sensing device. Moreover, the manual calibration procedure may have to be conducted when e.g. an environmental condition, such as humidity or temperature should be subject to a significant change. When switched into the manual calibration mode the processor may be operable to switch on the sensor controller, which in response to a power on or switching on may be operable to autonomously conduct the auto-calibration procedure, thereby deriving or providing the at least one calibration parameter. Calibration parameters obtained during such a manual calibration mode may then be received and stored in the memory.

Accordingly, the at least one calibration parameter is generated by the sensor controller during an auto-calibration procedure, which is conducted by the sensor controller in response of being switched on when the skin contact sensing device and/or the processor thereof is in the manual calibration mode.

Storage of the at least one calibration parameter in the memory may autonomously deactivate the manual calibration mode. Hence, after a successful execution of the auto calibration procedure leading to a storage of the at least one calibration parameter in the memory may trigger a deactivation of the manual calibration mode. Further and by deactivating the manual calibration mode the skin contact sensing device may automatically switch into the sensing mode.

According to a further example the contact sensor is a capacitive contact sensor. The contact sensor may comprise a capacitive electrode configured to get in direct mechanical contact with the skin or any other body portion of a user. A capacitive sensor may comprise one or several capacitive contact sensing elements, which may be electrically connected to each other.

Implementing of a capacitive contact sensor is beneficial in many aspects. Capacitive contact sensors are reliable, cost efficient to realize and may be easily implemented or integrated in a wearable electronic device.

Moreover, capacitive contact sensors are generally suitable for miniaturization. They may be commercially available at a variety of different sizes and geometries and may be therefore suitable for integration into a large variety of different application scenarios with electronic devices.

According to a further example the memory of the skin contact sensing device is a non-volatile memory. A non-volatile memory provides persistent storage of data, especially of the at least one calibration parameter even when disconnected from an electric energy supply. A non-volatile memory enables a non-permanent electric power supply and thus helps to reduce electrical power consumption over time.

According to another aspect the present invention further relates to a wearable electronic device comprising at least one of a housing and a frame and comprising a skin contact sensing device on or in at least one of the housing and the frame. The skin contact sensing device may be integrated into the housing or the frame and may be integrated or concealed by the housing and/or by the frame. With some examples the contact sensor of the skin contact sensing device may flush with a portion of the frame and/or of the housing of the wearable electronic device. In this way and when worn by a user of the wearable electronic device the contact sensor of the skin contact sensing device may get in direct skin contact.

In this way and when implemented with a wearable electronic device the skin contact sensing device is operable to detect if the wearable electronic device is actually worn by a user or not.

The wearable electronic device may be implemented as one of a smartwatch, a smartphone, a smart eyeglass, earphones or the like.

According to a further aspect the present invention further relates to a method of detecting contact to a skin. This skin contact detection method comprises the step of generating electrical contact signals being indicative of a skin contact by making use of a contact sensor. The method further comprises a processing of the electrical contact signals received from the contact sensor by a processor, which processor is connected to the contact sensor. The method further comprises a step of reading and obtaining at least one calibration parameter from a memory, which memory is operable to store the at least one calibration parameter. Finally, the method comprises a step of ascertaining a skin contact by processing the electrical contact signals on the basis of the at least one calibration parameter, wherein the at least one calibration parameter has been obtained from the memory.

With some examples the method is to be conducted by a skin contact sensing device as described above. Insofar, all features, effects and benefits as described above in connection with the skin contact sensing device equally apply to the method of detecting contact to a skin; and vice versa.

With a further example the method comprises the step of switching off a central controller connected to the contact sensor at predefined times over a predefined time interval.

With further examples the sensor controller is switched off during a first time interval t1 and is switched on during a second non-overlapping time interval t2, wherein the first time interval t1 is larger than the second time interval t2. This way, the method enables a substantial reduction of energy consumption.

According to a further example the method comprises the step of triggering a manual calibration of the contact sensor under predefined conditions. The manual calibration of the contact sensor may be triggered by a user when the skin contact sensing device and/or the wearable electronic device is exposed to predefined environmental or external conditions, e.g. when the contact sensor is out of contact with a skin of a user.

The method further comprises reading and obtaining the at least one calibration parameter generated by the sensor controller during the auto-calibration procedure conducted by the sensor controller in response of being switched on and subsequently storing of the at least one calibration parameter in the memory.

The calibration parameter stored in the memory, hence the stored calibration parameter may then be repeatedly used by the processor of the skin contact sensing device when the skin contact sensing device is in a sensing mode. When in the sensing mode, the sensor controller may be subject to a regular and/or repeated switching off. Only at predefined times and during predefined time intervals the sensor controller may be switched on, thereby conducting an auto-calibration procedure, which may equally provide calibration parameters. When and as long as in the sensing mode such calibration parameters being automatically generated and provided by the sensor controller may be discarded or disregarded. Instead, the previously stored calibration parameter(s) as provided in the memory and as generated and/or obtained during a manually user-triggered calibration routine will be used instead for determining if the skin contact sensing device is in contact with a skin or not.

BRIEF DESCRIPTION OF THE DRAWINGS

In the following numerous examples of the invention will be described in greater detail by making reference to the drawings, in which.

DETAILED DESCRIPTION OF THE INVENTION

Figure 1:
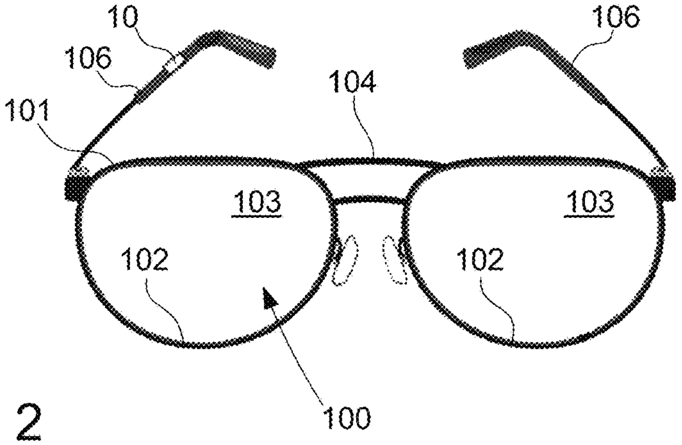
FIG. 1 schematically illustrates an example of a wearable electronic device equipped with a skin contact sensing device, FIG. 2 schematically shows a block diagram of an example of a skin contact sensing device.
Figure 2:
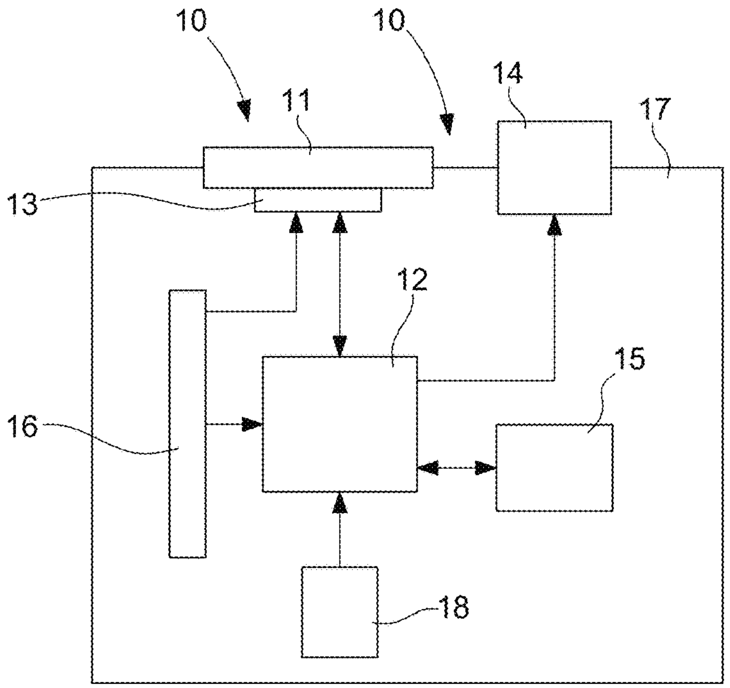

In FIG. 1 there is illustrated in example of a wearable electronic device 100. The wearable electronic device 100 is implemented as an eyeglass. The wearable electronic device 100 comprises a frame 101 with two rims 102, each of which being configured to hold or to fix a lens 103. The two rims 102 are interconnected by a bridge. Moreover, the outside portions of the rims 102 facing away from each other are each provided with a foldable temple 106. At least one of the temples 106 is provided with a skin contact sensing device 10, which is schematically illustrated in the block diagram of FIG. 2.

The skin contact sensing device 10 comprises a contact sensor 11, which may be implemented as a capacitive electrode. The contact sensor 11 is operated by a sensor controller 13. The sensor controller 13 may be driven by a power supply 16.

The skin contact sensing device 10 further comprises a processor 12, which is also powered by the power supply 16. The processor 12 may comprise a central processing unit (CPU) operable to control operation of the sensor controller 13. Moreover, the processor 12 is connected to the contact sensor 11 via the sensor controller 13. At least one of the sensor controller 13 and the processor 12 is operable to process electrical signals generated by and obtained from the contact sensor 11.

Figure 3:
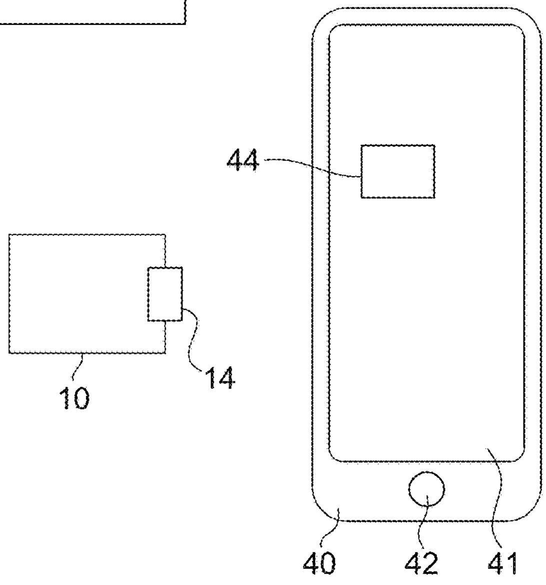
FIG. 3 is indicative of a skin contact sensing device and an external electronic device operable to communicate with the skin contact sensing device.

The skin contact sensing device 10 further comprises a memory 15 connected to the processor 12. The skin contact sensing device 10 further comprises a clock 18, which may be also implemented or integrated into the processor 12. The skin contact sensing device 10 further comprises a communication interface 14 enabling a wired or wireless communication with an external electronic device 40, e.g. illustrated in FIG. 3. An external electronic device 40 may be implemented as a smartwatch or as a smart phone. Such an external electronic device 40 may comprise a display 41 and a device input 42 by way of which a user may communicate with the external electronic device 40. The external electronic device 40 further comprises a communication interface 44 configured to establish a one-directional or bi-directional communication link with the communication interface 14 of the skin contact sensing device 10.

By way of the mutually corresponding communication interfaces 14, 44 there can be established a communication link between the skin contact sensing device 10 and the external electronic device 40 that allows to read or to distribute measurement results obtained by the contact sensor 11, to configure or to reconfigure the skin contact sensing device 10 and/or to enable a user interaction with the skin contact sensing device 10, which skin contact sensing device 10 may be void of an own user actuatable input, such as a button or dial.

The skin contact sensing device 10 is switchable into a sensing mode and into a manual calibration mode. Typically, the sensor controller 13 may be operable to conduct an auto calibration procedure in response of being switched on. In order to save energy and in order to enable use of the skin contact sensing device 10 with low power consumption applications it is beneficial to switch off the sensor controller 13 over a considerably long time interval. With some examples a skin contact sensing routine may be executed only during 5 seconds every minute. For the rest or residual time the sensor controller 13 may be switched off by the processor 12. In order to provide a well-defined timing for switching on and switching off, the processor 12 may be driven by the clock 18.

The sensor controller 13 may be commercially available. Such sensor controllers typically provide an auto-calibration procedure when being switched on. If the sensor controller 13 should be switched on while the contact sensor is already in contact with the skin of a user the auto-calibration procedure may lead to distortion or correction of the measurement routine. Therefore, the presently proposed skin contact sensing device 10 provides a kind of an auto-calibration bypass. Here, and when the contact sensing device is in the sensing mode and when the sensor controller 13 is regularly switched on and switched off, any calibration parameters obtained during or in response of switching on the sensor controller will be effectively discarded. Rather, previously stored calibration parameters will be read and obtained from the memory 15. Calibration parameters actually obtained and as provided by the sensor controller 13 upon switching on the sensor controller 13 will be substituted by respective calibration parameters read or obtained from the memory 15.

Only when the skin contact sensing device 10 is in the manual calibration mode calibration parameters as obtained from the sensor controller 13 upon switching on of the sensor controller 13 will be stored in the memory for further and subsequent use of the skin contact sensing device.

Figure 4:
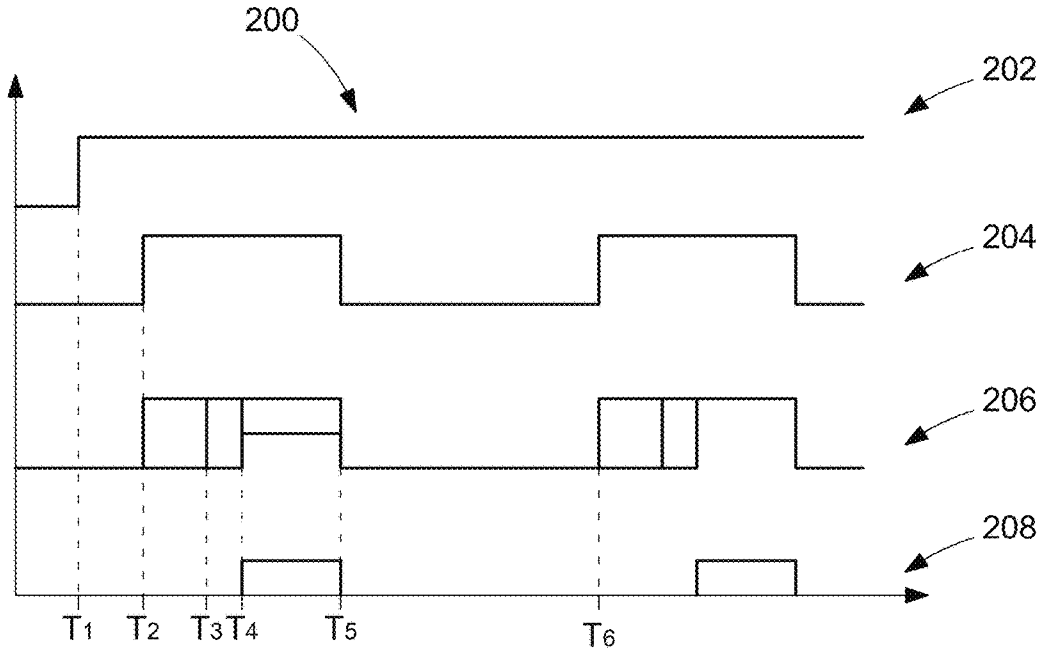
FIG. 4 shows a timing diagram being indicative of signal generated by the skin contact sensing device over time.
Figure 5:
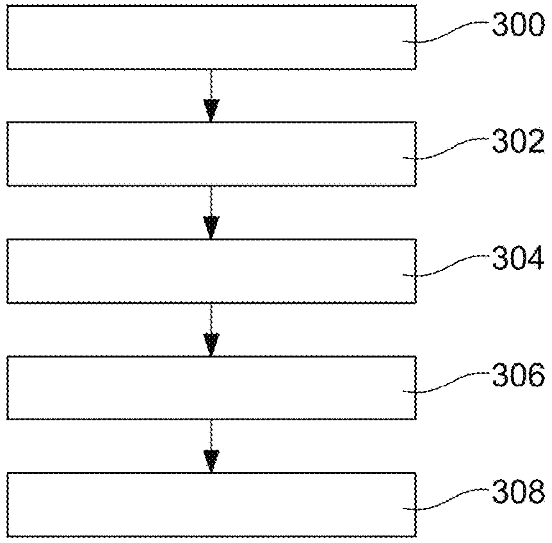
FIG. 5 is a flowchart of a manually conducted calibration procedure.

In the timing diagram 200 as illustrated in FIG. 4 the graph 202 is illustrative of a contact scenario for the skin contact sensing device. As indicated by the logical one the skin contact sensing device is in skin contact starting from a time T1. At a time T2 the sensor controller 13 is provided with electrical power and his hence switched on as indicated in the graph 204. During the time interval from T2-T3 the sensor controller 13 conducts an auto-calibration procedure and provides at least one calibration parameter, which is to be used for determining if the contact sensor 11 is in contact with a skin. Operation of the sensor controller 13 is indicated by graph 206.

In the subsequent time interval T3-T4 the calibration parameter previously stored in the memory 15 is/are read or obtained from the memory and is/are used to substitute the currently obtained calibration parameters. Thereafter and on the basis of contact signals obtained from the contact sensor 11 and on the basis of the calibration parameter stored in the memory 15 the processor 12 and/or the sensor controller 13 conducts a processing of the electrical contact signals on the basis of the at least one calibration parameter in order to determine a contact between the contact sensor and the skin of a user as illustrated in graph 208.

Hence, in the time interval between T4 and T5 the presence of a skin at the contact sensor 11 is detected. The signal as illustrated in the graph 208 may be further processed or distributed by the skin contact sensing device 10 and may indicate the presence of a skin contact with the contact sensor 11. After the time T5 and in order to save electrical power the sensor controller 13 is switched off and contact sensing is effectively paused until the sensor controller 13 is switched on again after lapse of a predefined time interval at a point of time T6. Then, the entire procedure may repeat.

Figure 6:
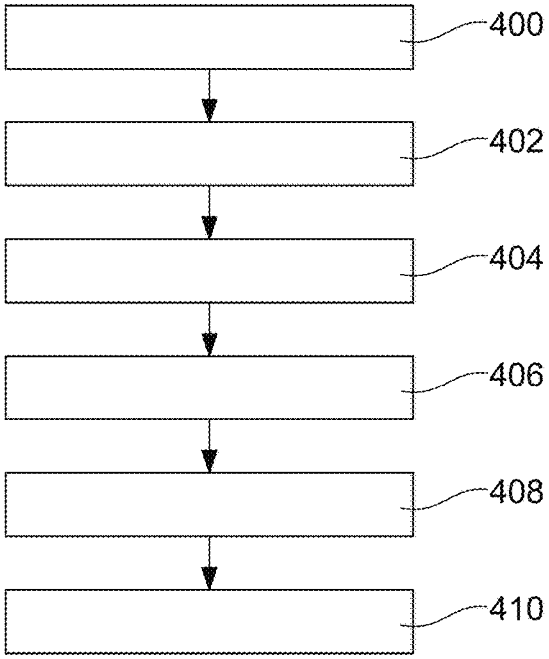
FIG. 6 is a flowchart of numerous steps of detecting a skin contact when the skin contact sensing device is in a sensing mode.

In FIG. 6 there is schematically illustrated a flowchart for conducting a calibration procedure. In a first step 300 the skin contact sensing device 10 and/or the respective wearable electronic device 100 is brought in a predefined condition. Here, the contact sensor 11 may be out of contact with a skin of a user. In a subsequent step 302 the sensor controller 13 is switched on and the auto-calibration procedure is automatically executed.

In step 304 the at least one calibration parameter is determined as a result of the execution of the auro-calibration procedure. In a subsequent step 306 the sensor controller 13 and hence the entire sensing hardware may be effectively switched off. This way, energy can be saved. In the further step 308 the at least one calibration parameter as obtained before is stored in the memory 15, which is preferably implemented as a non-volatile memory.

In the flowchart of FIG. 6 operation of the skin contact sensing device 10 in the sensing mode is schematically illustrated. Here, in step 400 the sensor controller 13 is switched on by the processor 12. Then, in step 402 the auto-calibration procedure is conducted or executed by the sensor controller 13.

The at least one calibration parameter as obtained by executing the auto-calibration procedure is then overwritten or discarded in step 404 and the previously stored calibration parameter as provided by the memory 15. With some examples calibration parameters obtained during the auto-calibration procedure upon switching on of the sensor controller 13 are overwritten by respective calibration parameters obtained and read from the memory 15.

In step 406 the processor 12 and/or the sensor controller 13 actually process the electrical contact signals generated by the contact sensor 11. Here, a capacitance measurement is conducted by making use of the contact sensor. The contact sensor 11 and/or the sensor controller 13 may then be switched off in the subsequent step 408. The electrical contact signals previously obtained in step 406 may be temporally stored in the memory 15 or in the processor 12. Then, and in step 410 the electrical contact signals may be compared with predefined reference values in order to determine if the contact sensor 11 is in contact with a skin or not. Processing of the electrical contact signals as provided by the contact sensor 11 concurrent with the at least one calibration parameter is typically provided by at least one of the processor 12 and the sensor controller 13.

NOMENCLATURE

10 detector arrangement
11 contact sensor
12 processor
13 sensor controller
14 communication interface
15 memory
16 power supply
17 electronic circuit
18 clock
40 electronic device
41 display
42 device input
44 communication interface
100 eyeglasses
101 frame
102 rim
103 lens
104 bridge
106 temple

The invention claimed is:

1. A skin contact sensing device (10) comprising:
a contact sensor (11) operable to generate electrical contact signals being indicative of a skin contact;
a processor (12) connected to the contact sensor (11) and operable to process the electrical contact signals received from the contact sensor (11); and
a memory (15) connected to the processor (12) and operable to store at least one calibration parameter,
wherein the processor (12) is operable to ascertain a skin contact by processing of the electrical contact signals on the basis of the at least one calibration parameter and
wherein the processor (12) is operable to read and to obtain the at least one calibration parameter from the memory (15),
wherein the sensing device further comprises a sensor controller (13) connected to the contact sensor (11) and controllable by the processor (12), wherein the processor (12) is operable to switch off and on the sensor controller (13), wherein the sensor controller (13) is operable to conduct an auto-calibration procedure in response to being switched on and to generate the at least one calibration parameter by conducting the auto-calibration procedure, wherein the skin contact sensing device (10) is switchable into a sensing mode, in which the processor (12) is operable to disregard the at least one calibration parameter provided by the sensor controller (13) in response of being switched on and to substitute the at least one calibration parameter provided by the sensor controller (13) by the at least one calibration parameter stored in the memory (15).

2. The skin contact sensing device (10) according to claim 1, wherein the processor (12) is operable to switch off the sensor controller (13) at predefined times over a predefined time interval.

3. The skin contact sensing device (10) according to claim 1, wherein the processor (12) is operable to switch off the sensor controller (13) during a first time interval t1 and to switch on the sensor controller (13) during a second time interval t2, wherein the first time interval is larger than the second time interval.

4. The skin contact sensing device (10) according to claim 1, wherein the skin contact sensing device (10) is switchable into a manual calibration mode, in which the processor (12) is operable to read and to obtain the at least one calibration parameter provided by the sensor controller (13) in response of being switched on and to store the at least one obtained calibration parameter in the memory (15).

5. The skin contact sensing device (10) according to claim 1, wherein the contact sensor (11) is a capacitive contact sensor.

6. The skin contact sensing device (10) according to claim 1, wherein the memory (15) is a non-volatile memory.

7. A wearable electronic device (100) comprising at least one of a housing and a frame (101) and comprising the skin contact sensing device (10) according to claim 1 that is on or in at least one of the housing and the frame (101).

8. A method of detecting contact to a skin comprising the steps of:
generating electrical contact signals being indicative of a skin contact by making use of a contact sensor (11);
processing the electrical contact signals received from the contact sensor (11) by a processor (12) connected to the contact sensor (11);
reading and to obtaining at least one calibration parameter from a memory (15) operable to store the at least one calibration parameter;

ascertaining a skin contact by processing the electrical contact signals on the basis of the at least one calibration parameter;

switching off a sensor controller (13) connected to the contact sensor (11), wherein the sensor controller (13) is controllable by the processor (12);

switching on the sensor controller (13), wherein the sensor controller (13) conducts an auto-calibration procedure in response of being switched on and generates the at least one calibration parameter by conducting the auto-calibration procedure; and in a sensing mode, disregarding the at least one calibration parameter provided by the sensor controller (13) in response of being switched on and substituting the at least one calibration parameter provided by the sensor controller (13) by the at least one calibration parameter stored in the memory (15).

* * * * *